United States Patent [19]

Muller et al.

[11] Patent Number: 5,085,696

[45] Date of Patent: Feb. 4, 1992

[54] METHODS AND COMPOSITIONS FOR TREATING METALS BY MEANS OF WATER-BORNE POLYMERIC FILMS

[75] Inventors: Frank A. Muller, West Los Angeles; Arnold E. Zaelke, South Gate, both of Calif.

[73] Assignee: Atochem North America, Inc., Philadelphia, Pa.

[21] Appl. No.: 735,481

[22] Filed: Jul. 25, 1991

Related U.S. Application Data

[63] Continuation-in-part of Ser. No. 679,879, Apr. 3, 1991, abandoned, which is a continuation-in-part of Ser. No. 575,042, Aug. 19, 1990, abandoned.

[51] Int. Cl.⁵ .................... C09K 15/04; C23F 11/00
[52] U.S. Cl. ................... 106/14.16; 106/14.14; 106/14.15; 106/14.17; 106/14.21; 106/14.42; 106/14.43; 106/14.44; 252/389.21; 252/391; 428/457; 428/461; 427/388.1; 427/388.2; 427/388.4
[58] Field of Search ............... 106/14.14, 14.15, 14.16, 106/14.17, 14.21, 14.42, 14.43, 14.44; 252/389.21, 391; 428/457, 461; 427/388.1, 388.2, 388.4

[56] References Cited

U.S. PATENT DOCUMENTS

| | | | |
|---|---|---|---|
| 3,297,616 | 1/1967 | Fisher, Jr. et al. | 106/14.21 |
| 4,066,398 | 1/1978 | Hwa | 106/14.13 |
| 4,317,744 | 2/1982 | Levi | 106/14.12 |
| 4,818,777 | 4/1989 | Braig | 252/391 |
| 4,894,091 | 1/1990 | Braig et al. | 252/391 |

FOREIGN PATENT DOCUMENTS

| | | | |
|---|---|---|---|
| 0286265 | 10/1988 | European Pat. Off. | 106/14.12 |
| 2807698 | 5/1979 | Fed. Rep. of Germany | 106/14.42 |
| 57-026175 | 2/1982 | Japan | 106/14.42 |
| 58-071968 | 4/1983 | Japan | 106/14.42 |

OTHER PUBLICATIONS

"Encyclopedia of Chemical Technology", Kirk-Othmer, vol. 9, pp. 14–17 (1952).
"Metals Handbook", 9th Edition, vol. 5, pp. 597–600 (1982).
"Preparation of Metals for Painting", Samuel Spring, pp. 94–95 and 142–158 (1965).

*Primary Examiner*—Mark L. Bell
*Assistant Examiner*—Anthony J. Green

[57] ABSTRACT

Corrosion resistance of metals such as aluminum is promoted by contact with a formulation containing an aqueous emulsion of an acrylic polymer; a blocked water-soluble zirconium catalyst; a volatile organic solvent/water mixture; and a corrosion additive component.

13 Claims, No Drawings

METHODS AND COMPOSITIONS FOR TREATING METALS BY MEANS OF WATER-BORNE POLYMERIC FILMS

CROSS-REFERENCE TO RELATED APPLICATION

This application is a continuation-in-part of application Ser. No. 679,879, filed Apr. 3, 1991, now abandoned, which in turn is a continuation-in-part of application Ser. No. 575,042, filed Aug. 29, 1990, abandoned.

FIELD OF THE INVENTION

This invention relates to non-chromated compositions and methods for applying protective films to the surface of metals, especially non-ferrous metals such as aluminum. More particularly, such metals are rendered resistant to the corrosive effects of salt-spray and the like by applying acrylic polymeric films from water-based emulsions. The compositions contain an aqueous emulsion of an acrylic polymer; a water-soluble, blocked zirconium catalyst; a non-toxic volative organic solvent in mixture with water; and a corrosion additive component (or package). Following application of the protective film (or coating), a "top coat" or painting is normally applied. Aircraft aluminum panels, naval structures, and many other applications that encounter severe corrosion environments are among products dependent on pre-treatment with protective coatings prior to painting.

BACKGROUND OF THE INVENTION

Traditional methods for obtaining salt-spray resistance of unpainted metal, such as high copper-containing aluminum alloys, without affecting adhesion of the top coat include conversion coating with hexavalent chrome solutions and the applications of solvent-based wash primers that contain insoluble chromate pigments and phosphoric acid—see, for example, "Encyclopedia of Chemical Technology", Kirk-Othmer, Volume 9, pages 14-17 (1952); "Metals Handbook", 9th Edition, Volume 5, pages 597-600 (1982); "Preparation of Metals for Painting", Samuel Spring, pages 94-96 and 142-158 (1965). Increasingly stricter hazardous waste restrictions have now placed limits on the use of such toxic chromium salts. Thus, the industry is in need of alternative protective coatings which will enable the unpainted metal to withstand 168 hours salt-spray attack.

SUMMARY OF THE INVENTION

A formulation is provided for coating the surface of a metal such as aluminum with a protective, polymeric film. The formulation contains (a) an aqueous emulsion of an acrylic polymer (can be thermosetting or thermoplastic, although the former is preferred), (b) a water-soluble blocked zirconium catalyst such as ammonium zirconium carbonate or an alkanolamine chelate of zirconium oxide, (c) a (non-toxic) volatile organic solvent in mixture with water, and (d) a corrosion additive such as 2-mercapto benzothiazole ("MBT"), sodium 2-mercapto benzothiazole ("SMB"), 2-mercapto benzimidazole, sodium 2-mercapto benzimidazole, or tolyltriazole. Also included may be defoamers, leveling agents, mold inhibitors, and the like.

The invention also provides a method for applying the protective coating to the metal surface in which the surface is contacted with the foregoing formulation and, when the acrylic polymer is thermosetting, the polymer is preferably cured. The preferred method of application is dipping.

DETAILED DESCRIPTION OF THE INVENTION

It has now been found that good corrosion resistance can be obtained by use of a combination of tough acrylic polymers; blocked zirconium water-soluble catalysts; nontoxic organic solvents in combination with water; and corrosion protection additives. The water-/solvent combination enhances film formation. The zirconium catalysts render the acrylic films water-insoluble and promote adhesion of the film to the top coat. Corrosion resistance of the metal interface is enhanced by replacing chromate inhibitors with non-toxic additives such as MBT, SMB, 2-mercapto benzimidazole, sodium 2-mercapto benzimidazole, and tolyltriazole.

This invention is particularly useful for protecting non-ferrous metals such as aluminum, zinc, magnesium, copper, cadmium, nickel, and titanium, but can also provide enhanced rust-proofing and paint adhesion characteristics to steel substrates. Aluminum and zinc are preferred, especially aluminum. Aluminum includes pure aluminum and alloys thereof including extrusions, cast, wrought, and sintered alloys. A preferred alloy is a high copper containing aluminum alloy such as 2024T3 which contains about 4% by weight copper.

The aqueous acrylic emulsions normally have a molecular weight of up to about 500,000, preferably about 100,000 to 500,000. The emulsion(s) generally comprise about 30-90% by weight of the formulation, normally about 55-70%. Acceptable results have, for example, been obtained with emulsions based on about 41-47% acrylic polymer, 0-2% anionic emulsifier such as dimethylaminoethanol, and 51-58% water, a molecular weight above 200,000, and a pH of 7.5-9.9. Such emulsions are available commercially, for example, as RHOPLEX AC1803 (thermosetting), RHOPLEX AC1561 (thermosetting), RHOPLEX WL 91 (thermoplastic), and RHOPLEX WL 96 (thermoplastic), products of the Rohm and Haas Company. Rhoplex AC1561 is a preferred emulsion because it will self-crosslink at elevated temperatures such as 150°-300° C. since the acrylic polymer contains hydroxy functionalities resulting from the polymerization of hydroxy functional acrylate and methacrylate monomers; such emulsions provide resistance to spotting (or removal) by solvents and do not release formaldehyde on curing. Acceptable results have also been obtained with thermoplastic acrylic emulsions based on 35-60% acrylic/styrene copolymers, 1-4% ammonium hydroxide, 40-64% water, 0-3% polypropylene glycol, and 0-3% octylphenoxy-polyethoxyethanol, a molecular weight above 200,000, and a pH of 8.3-9.0. Such emulsions are available commercially, for example, as JONCRYL 80, JONCRYL 537, and JONCRYL 554, products of Johnson Wax. Combinations of the thermoplastic acrylic emulsions have been found useful, as shown below Blocked ionic cross-linking catalysts such as ammonium zirconium carbonate ("AZC") or an alkanolamine chelate of zirconium oxide are useful because they only become active when the ammonium or amine portion has evaporated at the metal surface Coatings prepared without these catalysts exhibited poor adhesion of the top coat. For example, an aqueous solution of AZC containing the equivalent of 20% zirconium oxide has given acceptable results—it is available commercially as BACOTE 20, a product of Magnesium Elektron Inc., as has an alcoholic solution of 45-50% 1-propanol and 55-50% 1of the alkanolamine chelate of zirconium oxide, which solution is available commercially as TYZOR 212, a product of the DuPont company. The catalyst solution is used in relatively minor amounts such as from about 1-5%, normally about 1.6-4.5%. When increased bulk stability is required, such as extended periods at 110° F., the chelate catalyst is preferred.

Various volatile organic solvents in combination with water can be used, but those that do not swell acrylic latex particles in bulk are preferred to prevent viscosity changes in storage or transport. Propyl alcohol, iso-propyl alcohol, glycol ethers such as diethylene glycol monoethyl ether ("DGME") and ethylene glycol monopropyl ether ("EGME"), n-methylpyrrolidone, and combinations thereof, are typical preferred solvents. The solvents act as thickeners as the acrylic emulsion particles coalesce upon the evaporation of water at the metal surface. Tap or deionized water can be used, preferably deionized The solvents generally comprise about 3-20% of the formulation, more typically about 6-10%. The water generally comprises about 8-55% of the formulation, more typically about 17-33%.

A preferred corrosion additive is comprised of MBT, triethanolamine phosphate ("TEP"), and, optionally, 2,2′-methylenebis(4-methyl-6-t-butylphenol) ("MBMT"). SMB, MBT, 2-mercapto benzimidazole, and sodium 2-mercapto benzimidazole inhibit copper corrosion, TEP chelates copper ions and other alloying elements in high strength aluminum alloys, and the MBMT antioxidant aids in tying up oxygen during salt-spray exposure as well as protecting the dried film from UV degradation. The corrosion additives are generally used in minor amounts such as about 0.3-3.0%, more typically about 0.5-1.2%.

Other additives such as defoamers, leveling agents, and mold inhibitors can be used. Polyoxyethylene glycols are especially useful since they function both as an effective defoamer and as a surface tension modifier to promote metal wetting and surface leveling. The polyoxyethylene glycol used in the examples is PLURONIC L61 from Wyandotte Chemical having an approximate molecular weight of 2,000. Normal octanol can also be used as a defoamer if the final odor is not objectionable. A mold inhibitor such as methyl parahydroxy benzoate can also be used (available commercially as METHYL PARASEPT, a product of Kalama Chemical), usually in minor amounts Formulation pH ranges of about 7.5 to 10 are preferred in order to prevent premature destabilization.

To minimize foam and form colloidal dispersion of MBT corrosion inhibitor and MBMT antioxidant, it is preferred to predissolve these compounds into the volatile solvent phase first, and add dropwise to the acrylic emulsion that has been prediluted with water.

Concentrates may be prepared by simply leaving out most of the water.

Application of the coating can be by spraying, flow coating, or dipping. In the examples below, clean metal panels (2024T3 aluminum) were dipped into the formulation for about 5 seconds and quickly withdrawn. Drying of the surface is rapid, usually becoming tack-free in less than 15 minutes. The panels in Examples 2 and 6 were dipped twice. The panels from Examples 1 and 3 were cured for about one half hour at a temperature of 125°-150° C.; instead of heating the panels may simply be allowed to stand for about two weeks to a month at ambient temperatures.

In the following examples all percentages are by weight:

| | Ingredient | % |
|---|---|---|
| 1. | Thermosetting (pH = 9.05): | |
| | Rhoplex AC 1803 | 60.0 |
| | Deionized Water | 28.89 |
| | Bacote 20 | 2.5 |
| | SMB | 1.1 |
| | TEP | 0.03 |
| | N-methyl pyrrolidone | 5.0 |
| | Isopropyl alcohol | 2.4 |
| | Methyl Parasept | 0.01 |
| | MBMT | 0.05 |
| | Pluronic L61 | 0.02 |
| 2. | Thermoplastic (pH = 8.5): | |
| | Rhoplex WL 91 | 38.2 |
| | Rhoplex WL 96 | 22.8 |
| | Deionized water | 28.84 |
| | Bacote 20 | 2.5 |
| | SMB | 1.1 |
| | TEP | 0.03 |
| | DGME | 6.5 |
| | Methyl Parasept | 0.01 |
| | Pluronic L61 | 0.02 |
| 3. | Thermosetting (pH = 9.2): | |
| | Rhoplex AC 1803 | 65.0 |
| | Deionized water | 22.18 |
| | Tyzor 212 | 1.6 |
| | SMB | 1.1 |
| | TEP | 0.03 |
| | Normal propanol | 7.0 |
| | Isopropyl alcohol | 3.0 |
| | Methyl Parasept | 0.01 |
| | MBMT | 0.05 |
| | Pluronic L61 | 0.03 |
| 4. | Thermoplastic (pH = 8.7): | |
| | Joncryl 537 | 34.2 |
| | Joncryl 80 | 31.8 |
| | Deionized water | 20.34 |
| | Bacote 20 | 2.5 |
| | SMB | 1.1 |
| | TEP | 0.03 |
| | DGME | 5.0 |
| | Normal propanol | 5.0 |
| | Methyl Parasept | 0.01 |
| | Pluronic L61 | 0.02 |
| 5. | Thermoplastic (pH = 8.65): | |
| | Joncryl 554 | 60 |
| | Deionized water | 26.34 |
| | Bacote 20 | 2.5 |
| | SMB | 1.1 |
| | TEP | 0.03 |
| | EGME | 5.0 |
| | Normal Propanol | 5.0 |
| | Methyl Parasept | 0.01 |
| | Pluronic L61 | 0.02 |
| 6. | Thermoplastic (pH = 8.5): | |
| | Rhoplex WL 91 | 47.5 |
| | Rhoplex WL 96 | 22.5 |
| | Deionized water | 17.49 |
| | Tyzor 212 | 1.6 |
| | SMB | 1.1 |
| | TEP | 0.03 |
| | N-methyl pyrrolidone | 7.5 |
| | Isopropyl alcohol | 2.5 |
| | Methyl Parasept | 0.01 |
| | MBMT | 0.05 |
| | Pluronic L61 | 0.03 |

All example 1-6 formulations provided metal panels with protective films which passed the 168-hour salt spray resistance test (ASTM-B-117-73).

Example 1 was repeated using 0.5 MBT in place of 1.1 SMB and increasing the amount of water from 28.89 to 29.49. The formulation provided metal panels with films which passed 168-hour and 336-hour salt spray tests Moreover, these test requirements were also met when such panels were cured at room temperature for two weeks (i.e., at about 20°-25° C.)

The film-protected panels can be provided with top coats by well-known conventional methods to meet their intended end uses.

What is claimed is:

1. A formulation for coating the surface of a metal comprising, in percent by weight, (a) about 30-90% of an aqueous emulsion of a thermoplastic or thermosetting acrylic polymer, (b) about 1-5% of a water-soluble, blocked zirconium catalyst selected from ammonium zirconium carbonate or an alkanolamine chelate of zirconium oxide, (c) a mixture of water and a volatile organic solvent selected from propyl alcohol, isopropyl alcohol, glycol ethers, n-methylpyrrolidone, and combinations thereof, the water comprising about 8-55% of the formulation and the solvent about 3-20%, and (d) about 0.3-3.0% of a corrosion additive selected from 2-mercapto benzothiazole, sodium 2-mercapto benzothiazole, 2-mercapto benzimidazole, sodium 2-mercapto benzimidazole, and tolyltriazole.

2. Claim 1 wherein the metal is aluminum.

3. Claim 1 wherein the metal is a copper-containing aluminum alloy.

4. Claim 1 wherein the acrylic polymer is thermosetting.

5. Claim 4 wherein the acrylic polymer contains hydroxy functionalities.

6. Claim 1 wherein the acrylic polymer is thermoplastic.

7. A process for applying a protective coating to the surface of a metal which comprises contacting said surface with a formulation comprising, in percent by weight, (a) about 30-90% of an aqueous emulsion of a thermoplastic or thermosetting acrylic polymer, (b) about 1-5% of a water-soluble, blocked zirconium catalyst selected from ammonium zirconium carbonate or an alkanolamine chelate of zirconium oxide, (c) a mixture of water and a volatile organic solvent selected from propyl alcohol, isopropyl alcohol, glycol ethers, n-methylpyrrolidone, and combinations thereof, the water comprising about 8-55% of the formulation and the solvent about 3-20%, and (d) about 0.3-3.0% a corrosion additive selected from 2-mercapto benzothiazole, sodium 2-mercapto benzothiazole, 2-mercapto benzimidazole, sodium 2-mercapto benzimidazole, and tolyltriazole.

8. The coated metal produced by the process of claim 7.

9. The process of claim 7 wherein the acrylic polymer is thermosetting and contains hydroxy functionalities.

10. The process of claim 9 further comprising the step of curing the applied coating.

11. The coated metal produced by the process of claim 10.

12. The process of claim 7 wherein the metal is aluminum.

13. The process of claim 7 wherein the metal is a copper-containing aluminum alloy.

* * * * *